Sept. 13, 1955        H. MARTIN        2,717,724

GREASE GUN

Filed April 9, 1952

INVENTOR
HENRY MARTIN
BY *Harry Hansen*
AGENT 2,717,724
Patented Sept. 13, 1955

2,717,724

GREASE GUN

Henry Martin, Chatsworth, Ill.

Application April 9, 1952, Serial No. 281,413

3 Claims. (Cl. 222—326)

This invention relates to grease guns, and particularly to a method and means for filling grease guns.

Grease guns of the type comprising a cylinder in which a spring actuated plunger is reciprocably mounted, which presses the grease through an aperture in the end cover of the gun, have hitherto been filled by removing the end cover, retracting the plunger to its rear position and locking it there, and then scooping up grease from a can or some bulk storage container by means of the fingers or some suitable tool and introducing it piecemeal through the open end of the gun towards the retracted plunger.

This procedure is dirty and cumbersome. Care has to be taken to avoid air pockets in the cylinder. And when using the grease gun on a vehicle employed for a considerable period of time away from a supply of grease, such as mobile farm machines, road machines, and others, it is necessary to check the grease supply in the gun prior to departure or to carry cans or other containers with grease for refilling the gun in the field.

Another serious disadvantage in connection with these prior art grease guns is the difficulty of avoiding contamination of the grease during the filling procedure. Under field conditions, sand, grit, small stones, water, snow and other foreign substances very easily find their way into the grease and, with it, into the gun causing difficulties and sometimes serious damage to the gun and to the machines being greased from the gun.

The present invention eliminates the abovementioned and other difficulties and disadvantages. An object of the invention is to provide a method and means of filling a grease gun rapidly and cleanly and without risk of contaminating the grease in the procedure.

Another object of the invention is to provide a grease cartridge which, filled with grease, can readily be inserted in the cylinder, or barrel, of the grease gun upon removal of an end cover therefrom.

Still another object of the invention is to provide a cartridge of the kind referred to which upon insertion into the gun barrel presents a smooth inner surface for the gun plunger to slide on and to seal against.

Figure 1:
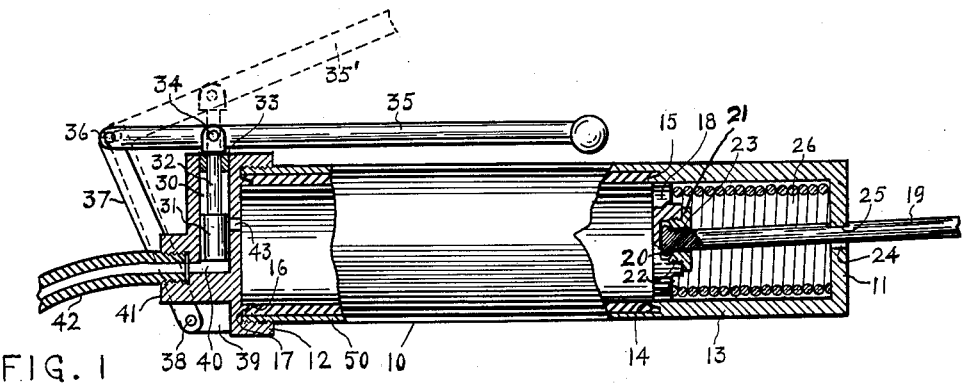
Figures 2, 3:
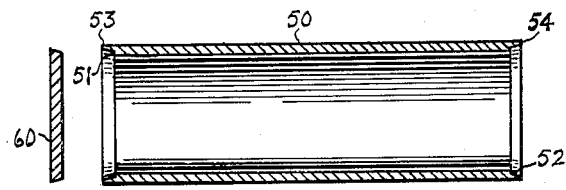
Figure 4:
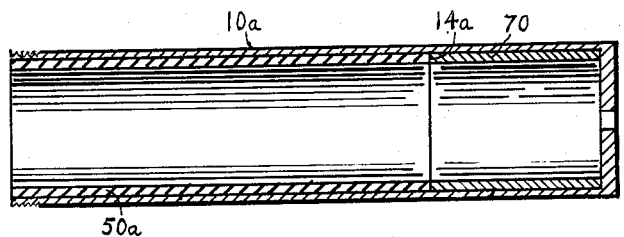
Figure 5:
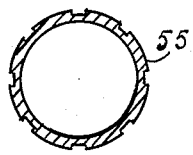

Other objects and advantages of the invention will be apparent from the following description thereof, having reference to the accompanying drawing, in which:

Fig. 1 shows an elevation of a grease gun incorporating the invention, certain parts thereof being shown in a longitudinal section on the axis of the gun, Fig. 2 is a cross-sectional view of an end cover for a grease cartridge, Fig. 3 shows a longitudinal section of a grease cartridge, Fig. 4 shows a longitudinal section of a grease gun barrel provided with a modified form of grease cartridge, and Fig. 5 is a cross-sectional view of a grease cartridge.

The grease gun shown in the drawing comprises a cylinder, or barrel, 10 closed at one end which for convenience of reference will be called the rear end, by an end cover 11 and at the opposite end by a screw cap 12. The rear portion of the barrel 10 has a reduced inner diameter, as shown at 13, and at the front end of said portion 13 an annular shoulder 14 is formed, said shoulder 14 being provided with an annular groove 15 therein. A similar shoulder 16 and groove 17 are formed on the inside of the screw cap 12.

A plunger 18 is mounted in the barrel 10 for reciprocatory movement longitudinally thereof, and said plunger 18 is provided with a plunger rod 19 having a knob or handle (not shown) on its rear end and a flange 20 on its front end, said flange 20 being held against the plunger 18 with some play by means of a nut 21 having a screw-threaded connection with the plunger 18. The aperture for the rod 19 in said nut 21 is tapered, as shown at 23, so as to allow a limited transverse movement of the plunger rod 19.

The plunger rod 19 extends through an opening 24 in the end cover 11 and is provided with a lateral recess 25, the bottom of which can be brought into engagement with the edge of the opening 24 through a slight transverse movement of the rod 19, so as to lock the plunger rod 19 against longitudinal movement. A compression spring 26 rests with one end on the end cover 11 and with its opposite end on the plunger 18.

The screw cap 12 is provided, on its outside, with a well known mechanism for transmitting grease from the gun to the machine part to be greased. Said mechanism comprises a small transverse cylinder 30 containing a reciprocably mounted plunger 31 having a plunger rod 32 extending through a cover 33 to the outside. The plunger rod 32 has a pivot connection 34 with a lever 35, the front end of which has a pivot connection 36 with an arm 37 which, in turn, is provided with a pivot connection 38 with a lug 39 projecting from the screw cap 12.

From the inner end of the cylinder 30 a conduit 40 extends through a boss 41 to connect with a flexible tube 42 screw-threadedly connected to said boss 41. If desired, the arm 37 may be fork-shaped so as to straddle the boss 41, or it can be otherwise shaped in any suitable way to provide a symmetrical arrangement. An aperture 43 is provided in the screw cap 12 which connects the interior of the barrel 10 with the cylinder 30.

A cylindrical grease cartridge 50 is provided with an annular shoulder 51 at one end and with a similar shoulder 52 at its opposite end. Annular extensions 53 and 54, respectively, surround these shoulders 51, 52. It will be noted that the two ends of the cartridge 50 are identical, and the shoulders 51, 52 are spaced so that they engage the shoulders 14 and 16 in the grease gun, when the screw cap 12 is in position on the front end of the barrel 10. The extensions 53, 54 then extend into the grooves 15, 17 referred to above. The inner diameter of the cartridge is equal to the inner diameter of the portion 13 of the barrel 10. The grooves and extensions have a tapered wall, as shown.

The cartridge 50 may consist of any suitable material but is preferably made of cardboard or a similar material. The annular extensions 53, 54, by their engagement in the annular grooves 15, 17, provide a means whereby small irregularities in the cylindrical shape of the cartridge are corrected and prevented from interfering with the smooth working of the plunger 18 when the cartridge 50 is clamped in position in the barrel 10. The cartridge 50 is preferably provided with exterior continuous grooves 55 (Fig. 5) for a purpose explained below. The shape, number, and arrangement of said grooves 55 may vary widely as long as they extend continuously from end to end of the cartridge.

Fig. 2 shows a cover 60 fitting against the shoulder 51 in the cartridge 50 within the annular extension 53. A similar cover (not shown) is provided for the opposite end of the cartridge.

When the grease gun described above is to be refilled, the lever 35 is moved to the position indicated in dotted lines at 35′, whereby the plunger 31 is moved upwards so as to provide free communication between the interior of the gun barrel 10 and the atmosphere through aperture 43, cylinder 30, conduit 40, and the flexible tube 42. Since the opening 24 also provides free communication between the barrel and the atmosphere around the plunger rod 19, the plunger 18 can then readily be retracted to the position shown in Fig. 1 against the action of the spring 26. The plunger 18 is locked in this retracted position by engagement of the recess 25 in the plunger rod with the edge of the opening 24, as mentioned above.

The screw cap 12 is then removed and the cartridge 50 is pulled out of the barrel 10 through the open front end thereof. One end cover 60 is removed from a fresh filled grease cartridge 50, and said cartridge is inserted into the barrel 10 with the open end first. This insertion is carried out easily and without resistance, since the air in the barrel 10 between the plunger 18 and the cartridge can escape through the grooves 55 on the exterior surface of the cartridge 50.

When the cartridge 50 has been completely inserted, the other end cover 60 is removed therefrom and the screw cap 12 is replaced onto the end of the barrel 10. Naturally, if desiredd both end covers 60 can be removed before inserting the cartridge.

The operation of the gun in use is identical with the operation of a prior art gun without a grease cartridge. In other words, the flexible tube 42 is secured to the machine part to be greased by known means (not shown), the plunger 31 is moved to a position in which it leaves the aperture 43 open, and the plunger rod 19 is released from its engagement with the edge of the opening 24. The spring 26 then drives the plunger 18 forward, until grease has been pressed out through the aperture 43 to fill the conduit 40. The spring 26 is relatively weak and is not able to press the grease into the place to be greased.

The lever 35 is moved to the position shown in full lines in Fig. 1, whereby the plunger 31 presses the grease in front of it out through the tube 42, at the same time closing the aperture 43. The procedure is repeated as necessary.

A modified embodiment of the invention is illustrated in part in Fig. 4, only the barrel 10a without the screw cap 12 and the movable parts 18, 19, 26 being shown.

In this embodiment, the barrel 10a has the same inner diameter throughout its length. An insert 70 is disposed at the rear end of the barrel 10a, said insert providing a shoulder 14a at its free end. A cartridge 50a abuts against said shoulder 14a and has straight cut ends, as shown. The screw cap 12 (not shown) has a plane inside surface without the annular extension 17 of Fig. 1.

The operation of this modified embodiment should be obvious from the above description. It is evident that an insert 70 could be provided with the annular groove structure 15 of Fig. 1 and that the barrel 10 of Fig. 1 could be made with a grooveless shoulder similar to that of Fig. 4. Other modifications are feasible within the scope of the appended claims. The modification having an insert 70 is particularly useful in connection with conversion of already existing grease guns in which it is desirable to employ the present invention. Reduction of the diameter of the plunger 18 and replacement of the spring 26 may be necessary in such cases. A sealing wrapper of cellophane or similar material may be provided for the cartridges in their commercially available form.

The above detailed description of one particular grease gun is to be regarded as an example only without other influence upon the scope of protection than required by the limitations in the claims.

What I claim is:

1. In a grease gun, a barrel having a substantially cylindrical bore therein, a front end cover on said barrel, outlet means in said front end cover, means for ejecting grease through said outlet means including a piston reciprocably mounted in said barrel, spring means urging said piston towards the front end of the gun, a piston rod tiltably secured to said piston and extending rearwardly out of said barrel, means for locking said piston in a retracted position in said barrel against the action of said spring means by lateral tilting movement of the piston rod and a circumferential shoulder in said barrel facing the front end of said gun and sloping outwardly and rearwardly from said bore to define a seating surface for the rear end of a removable grease cartridge made of softer material than the barrel and having substantially the same wall thickness as the width of said shoulder, said grease cartridge being bevelled at its rear end to conform to said outwardly and rearwardly sloping shoulder and being held in engagement with said shoulder by said front end cover, whereby said bore and the interior surface of said cartridge provide a smooth continuous surface for engagement with said piston which, through the engagement of the rear end of the cartridge with said sloping shoulder, is prevented from tearing said rear end or being stopped by the same in the forward movement of the piston.

2. A grease gun as in claim 1, in which said shoulder is provided by an insert in the rear portion of the barrel, said bore being provided in said insert.

3. A grease cartridge suitable for use in a grease gun as set forth in claim 1, comprising a substantially cylindrical body, one end of which is bevelled so as to form part of a truncated conical surface having its apex in the direction of the opposite end of the cartridge.

References Cited in the file of this patent
UNITED STATES PATENTS

| | | |
|---|---|---|
| 1,269,438 | Hieatzman | June 11, 1918 |
| 1,621,109 | Drummond | Mar. 15, 1927 |
| 1,729,219 | Kellogg | Sept. 24, 1929 |
| 1,996,792 | Bystricky et al. | Apr. 9, 1935 |
| 2,518,523 | Cimbura et al. | Aug. 15, 1950 |
| 2,591,653 | Altiere et al. | Apr. 1, 1952 |